(12) United States Patent
Chakrabarti et al.

(10) Patent No.: US 9,032,068 B2
(45) Date of Patent: May 12, 2015

(54) SERVICE ASSURANCE USING NETWORK MEASUREMENT TRIGGERS

(75) Inventors: Samita Chakrabarti, Sunnyvale, CA (US); Tomas Thyni, Jarfalla (SE); Christoph Meyer, Herzogenrath (DE); Robert C. Frazier, Dublin, CA (US); Scott Andrew Mansfield, Evans City, PA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 124 days.

(21) Appl. No.: 13/289,854

(22) Filed: Nov. 4, 2011

(65) Prior Publication Data

US 2013/0117434 A1    May 9, 2013

(51) Int. Cl.
| | | |
|---|---|---|
| *G01R 31/08* | (2006.01) | |
| *G06F 11/00* | (2006.01) | |
| *G06F 15/173* | (2006.01) | |
| *H04L 12/801* | (2013.01) | |
| *H04L 12/721* | (2013.01) | |
| *H04L 12/841* | (2013.01) | |

(52) U.S. Cl.
CPC .............. *H04L 47/12* (2013.01); *H04L 45/70* (2013.01); *H04L 47/283* (2013.01)

(58) Field of Classification Search
CPC ... H04L 43/106; H04L 43/50; H04L 43/2697; H04L 43/0829; H04L 12/2697; H04L 43/0876; H04L 43/0864
USPC ......................................................... 709/224
See application file for complete search history.

(56) References Cited

U.S. PATENT DOCUMENTS

| 6,754,219 | B1 * | 6/2004 | Cain et al. ...................... 370/401 |
| 8,413,247 | B2 * | 4/2013 | Hudis et al. ...................... 726/25 |
| 2008/0228915 | A1 * | 9/2008 | Tamura ........................ 709/224 |
| 2008/0279103 | A1 * | 11/2008 | Yong et al. ..................... 370/235 |

(Continued)

OTHER PUBLICATIONS

Baillargeon, et al., "TWAMP Value-Added Octets," accessed at http://tools.ietf.org/html/draft-baillargeon-ippm-twamp-value-added-octets-01 on Aug. 18, 2011, 22 pages.

(Continued)

*Primary Examiner* — Kevin Bates
*Assistant Examiner* — Emad Siddiqi
(74) *Attorney, Agent, or Firm* — Blakely Sokoloff Taylor & Zafman

(57) ABSTRACT

A method performed in a network element for reacting to communication performance measurements that fall outside of communication performance thresholds. The network element generates a communication performance measurement between a first endpoint and a second endpoint, wherein each endpoint is a point of communication in the network and at least the first endpoint resides on the network element. The network element retrieves a communication performance threshold and determines whether the communication performance measurement falls outside of the communication performance threshold. The network element generates a trigger associated with the communication performance measurement and the communication performance threshold when it is determined that the communication performance measurement falls outside of the communication performance threshold. The network element retrieves a registered handler associated with the generated trigger to indicate that the registered handler requires execution in response to the generated trigger and executes the registered handler.

21 Claims, 4 Drawing Sheets

(56) References Cited

U.S. PATENT DOCUMENTS

| | | | |
|---|---|---|---|
| 2010/0165852 A1* | 7/2010 | Kozuka et al. | 370/249 |
| 2010/0185901 A1* | 7/2010 | Hirsch | 714/48 |
| 2010/0254409 A1* | 10/2010 | Lu et al. | 370/477 |
| 2011/0222412 A1* | 9/2011 | Kompella | 370/241.1 |
| 2011/0267952 A1 | 11/2011 | Ko et al. | |

OTHER PUBLICATIONS

Busi, et al., "Operations, Administration and Maintenance Framework for MPLS-based Transport Networks," accessed at http://tools.ietf.org/html/draft-ietf-mpls-tp-oam-framework-11 on Aug. 18, 2011, 65 pages.

Hedayat, K., et al., "A Two-Way Active Measurement Protocol (TWAMP)", accessed at http://tools.ietf.org/html/rfc5357 on Aug. 18, 2011, 26 pages.

Katz, D., et al., "Bidirectional Forwarding Detection (BFD)," accessed at http://tools.ietf.org/html/rfc5880 on Aug. 18, 2011, 49 pages.

"Cisco IOS IP Service Level Agreements Technical Overview," Cisco Systems, Internet Technologies Division, Nov. 2004, 35 pages.

"Cisco IOS IP Service Level Agreements an Overview," Cisco Systems, Internet Technologies Division, Nov. 2004, 23 pages.

"Cisco IOS IP Service Level Agreements," User Guide, Cisco Systems, Internet Technologies Division, Nov. 2004, 57 pages.

* cited by examiner

SERVICE ASSURANCE USING NETWORK MEASUREMENT TRIGGERS

FIELD

Embodiments of the invention relate to the field of computer networking; and more specifically, to triggering action based on network performance measurements.

BACKGROUND

A computer network is a geographically distributed collection of interconnected communication links and subnetworks for transporting data between nodes, such as computers. Many types of computer networks are available, with the types ranging from local area networks (LANs) to wide area networks (WANs). A LAN is an example of a subnetwork that provides relatively short distance communication among the interconnected stations, whereas a wide area network enables long distance communication over a larger geographic area using links provided by public or private telecommunications facilities. The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as routing domains or autonomous systems. The networks within an autonomous system are typically coupled together by conventional intradomain routers. These routers manage communication among local networks within their domains and communicate with each other using an intradomain routing (or an interior gateway) protocol. Furthermore, the routers typical reroute information around network outages since typical inter-domain networks provide multiple paths between two end points. For example, Bidirectional Forwarding Detection (BFD) described in *Request for Comments* (5880), by D. Katz et al. (2010), provides a mechanism for a router to detect a communication failure with an adjacent router.

It is possible to measure the communication performance between two end points of a computer network. Active measurement protocols are a mechanism for measuring this performance. An example of such a protocol is the Two-Way Active Measurement Protocol (TWAMP) described in *RFC 5357*, by K. Hedayat et al. (2008). TWAMP defines how to measure the delay, jitter, packet loss ratio, and connectivity. Another example of such a protocol is described in *TWAMP Value-Added Octets, Internet Engineering Task Force (IETF) Draft*, by S. Baillargeon (2011), for extending TWAMP to measure capacity.

SUMMARY

Embodiments of the invention include a method performed in a network element that is operating in a network. The method is for reacting to communication performance measurements that fall outside of communication performance thresholds. The network element generates a communication performance measurement between a first endpoint and a second endpoint, wherein each endpoint is a point of communication in the network and at least the first endpoint resides on the network element. The network element retrieves a communication performance threshold and determines whether the communication performance measurement falls outside of the communication performance threshold. The network element generates a trigger associated with the communication performance measurement and the communication performance threshold when it is determined that the communication performance measurement falls outside of the communication performance threshold. The network element retrieves a registered handler associated with the generated trigger to indicate that the registered handler requires execution in response to the generated trigger and executes the registered handler.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
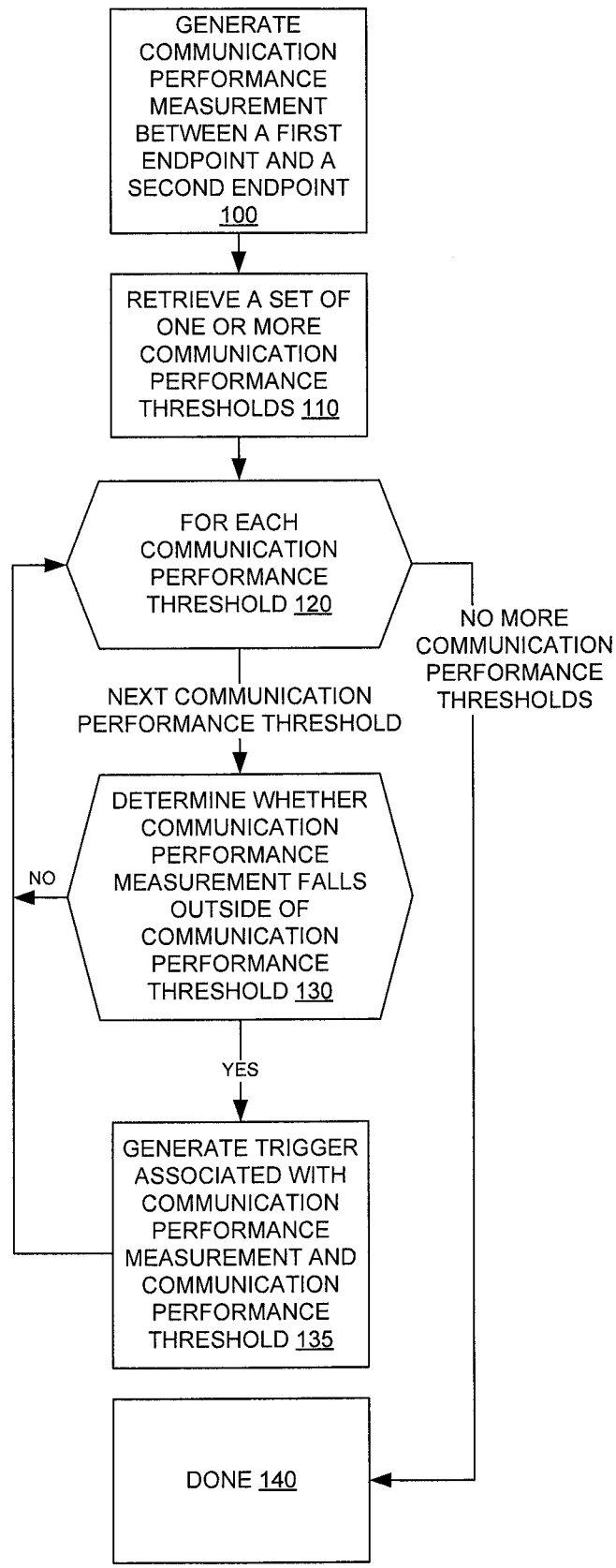
FIG. 1 is a flow diagram that illustrates exemplary operations for generating triggers in response to communication perform measurements according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Exterior Gateway Protocol(s), Shortest Path Bridging Protocol, Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics. For each routing or switching protocol, a layer two or layer three routing or switching application executes to handle that routing or switching protocol; furthermore other layer two or layer three routing or switching applications may be used to implement other routing or switching protocols. Further, the data plane typically comprises one or more line cards that provide physical ports that provide links from the network element to other network elements. In some configurations, multiple ports on multiple line cards provide multiple links between itself and other line cards and/or the network element and another destination network element, i.e. endpoint. It is often the case that multiple intermediary network elements provide the route, or path, for packets between the network element and destination network element and that two links provide to separate routes, some of which may overlap, to the destination network element.

FIG. 1 is a flow diagram that illustrates exemplary operations for generating triggers in response to communication performance measurements according to one embodiment. In the cycle of operations, the flow begins in operation 100 with a performance monitor in a network element generating a communication performance measurement between itself and an endpoint. Thus, the network element is generating a communication performance measurement between a first endpoint (e.g. a source line card or network element) and a second endpoint (e.g. a destination line card or second network element). The communication performance measurement is made in accordance with the TWAMP or TWAMP Value-Added Octets standards. As described in the corresponding standards, the network element generates a source test packet that includes data providing metrics that allow communication performance to be measured. Upon the endpoint receiving the source test packet, the endpoint generates a response test packet that is communicated back to the network element. Using knowledge of the data contained within the source test packet and data from the response test packet, the performance monitor can generate the communication performance measurement. The flow continues in operation 110 with the performance monitor retrieving a set of one or more communication performance thresholds that are associated with the link to the endpoint.

The flow continues in operation 120 with the performance monitor iterating through each communication performance threshold in the set of one or more communication performance thresholds. Once all communication performance thresholds in the set have been processed, flow is done at 140. While more communication performance thresholds need processing, the flow continues at operation 130 with the performance monitor determining whether the communication performance measurement falls outside of the communication performance threshold being processed. If the communication performance measurement falls within the communication performance threshold, then processing continues with iterating to the next communication performance threshold in operation 120. If the communication performance measurement falls outside the communication performance threshold, then processing continues with generating a trigger associated with the communication performance measurement and the communication performance threshold, operation 135.

In one embodiment, network elements utilize performance measurements to introduce a trigger that induces appropriate actions based on the trigger type and related information. For example, a network element may determine network issues using the performance measurements and introduce a trigger that chooses an alternative path to another endpoint. Specifically, a network element may utilize TWAMP or TWAMP Value-Added Octets to determine that a current path or link to an endpoint is not meeting designated communication performance thresholds. The network element can measure various metrics to an endpoint such as delay, jitter, packet-loss ratio, and connectivity utilizing techniques from TWAMP and may further measure capacity utilizing techniques from TWAMP Value-Added Octets. An operator of a network element can specify acceptable communication performance thresholds between the network element and an endpoint. These thresholds may define minimum and maximum performance thresholds that should be addressed should the measured performance fall outside of the threshold. The operator may define the communication performance thresholds based on the operators' experience in the network; based on a designated service level agreement (SLA) with that endpoint; based on the link's speed such as 10 mega-bits/second (Mbps), 100 Mbps, or 1000 Mbps; or some other method defining the communicate performance thresholds.

In response to a measurement falling outside of the threshold, the network element chooses an alternative path or link with that endpoint if such an is such alternative path exists. The alternative path or link should fall within those thresholds. The alternative path may be designated by utilizing a different next hop than previously used for traffic to that endpoint in internet protocol (IP) network, or the alternative path may be designated by associating a new rule from a rule table for traffic to that endpoint thereby utilizing a new Multiprotocol Label Switching (MPLS) Label Switched Path (LSP) for that traffic in an MPLS network.

In one embodiment, assuming the communication performance thresholds are a range is defined as minimum threshold B1 should be less than communication performance measurement Bm which should be less than maximum threshold B2, then this relationship can be represented as B1<Bm<B2. As the Bm approaches the lower value B1, this indicates that the link between the network element and the endpoint is congested or an unacceptable threshold point has been reached; i.e. network performance is degrading along that path. As Bm approaches the higher value B2, this indicates that the link between the network element and the endpoint is under-utilized. An under-utilized indication may occur because the network element and the endpoint are sharing the same physical or logical link. If Bm<B1, the network element will generate a trigger Tb1; alternately it will generate a trigger Tb2 if Bm>B2.

Tb1 indicates that a processing module should look up alternate paths between the network element and the endpoint that are available and configured to provide bandwidth B1 and higher. If such alternate path is available the processing module (MPLS or Routing system) will then change its path to the chosen new path. If Tb2 is generated then the local policy of the routing protocol will determine how to handle the situation. For example, the routing system may decide to aggregate two flows, designated by source address, destination address, port, and description, into the same path for correct utilization of the connected link.

In another embodiment, the communication performance threshold may be delay, jitter, packet-loss ratio, throughput, or connectivity. This allows for an IP performance implementation using TWAMP measurements. The implementation reads the communication performance measurement for different measurement parameters (delay, jitter, packet-loss ratio, throughput or connectivity) and associated communication performance thresholds. If the measurement goes out of range of the thresholds, an appropriate trigger is generated and an appropriate module, which has registered with a performance monitoring module, is passed information based on that trigger. Using local policies, the registered module can initiate actions in response to the trigger; such as choose an appropriate alternate route to bring the communication performance measurement within the identified threshold.

The techniques described with reference to embodiments of the invention allow an operator to configure a network element to react to changing network conditions by configuring modules to register for notification of the trigger. For example, MPLS Transport Profile Operations, Administration, and Maintenance (MPLS-TP OAM) applications; MPLS Traffic Engineering (MPLS-TE) applications; Border Gateway Protocol Traffic Engineering (BGP-TE) applications; and Open Shortest Path First Traffic Engineering (OSPF-TE) applications to react to changing network conditions. Further, these techniques allow for the early detection of problem situations in live networks or in pre-deployment network testing to ensure network design is capable of handling delay, jitter, or packet loss by the implemented protocols and designs. It would be obvious to one of skill in the art that techniques described by embodiments of the invention may be used with other routing applications and other network applications.

Figure 2:
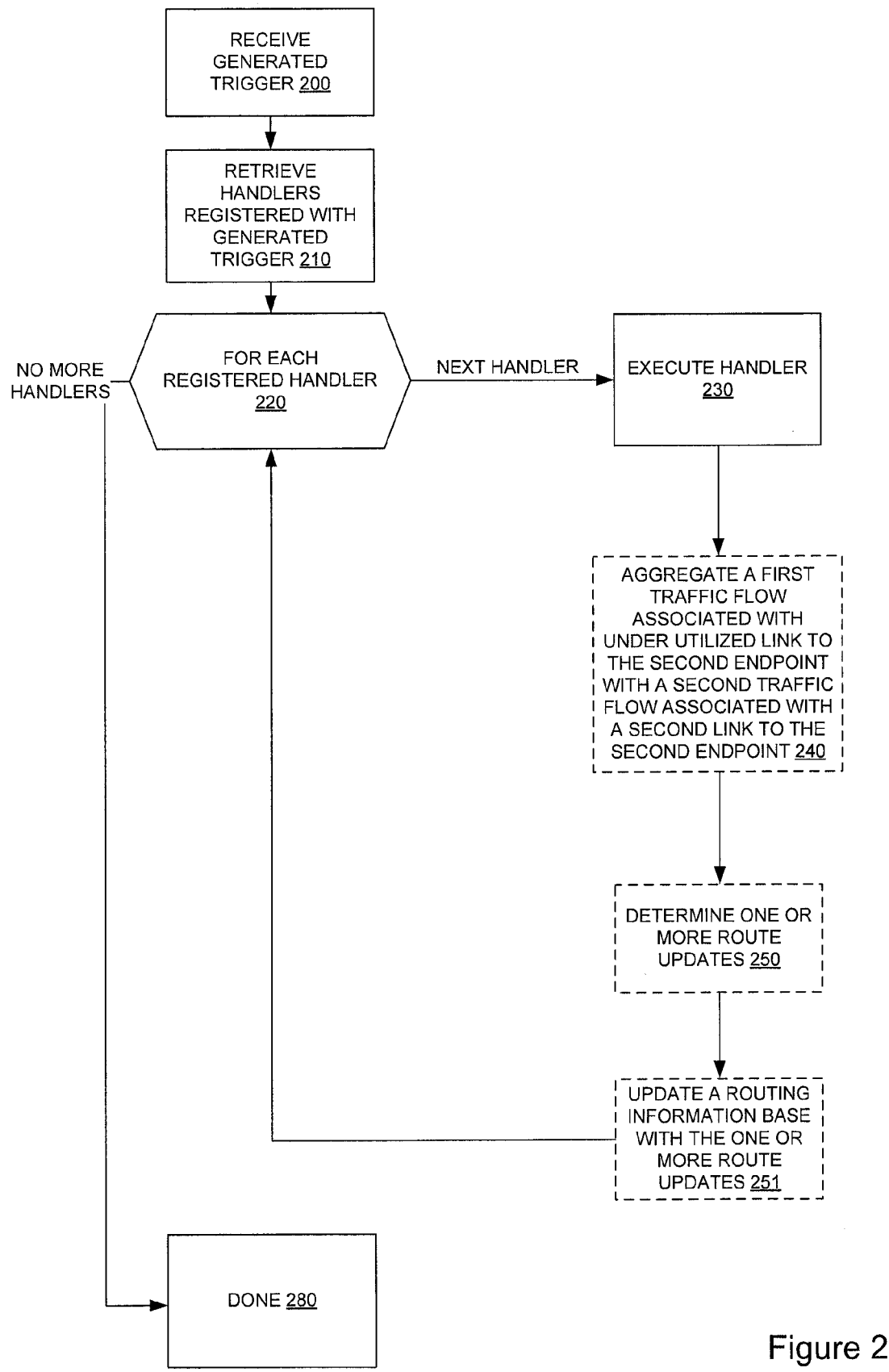
FIG. 2 is a flow diagram that illustrates exemplary operations for responding to triggers according to one embodiment.

FIG. 2 is a flow diagram that illustrates exemplary operations for responding to triggers according to one embodiment. In the cycle of operations, the flow begins in operation 200 with a trigger handling module in a network element receiving a generated trigger such as a trigger generated in accordance with FIG. 1. The flow continues at operation 210 with the trigger handling module retrieving a set of one or more handlers registered with the generated handler. Various routing applications, traffic engineering applications, or administration applications may register in association with a trigger. For example, a routing application may register in association with a trigger generated in bandwidth below a minimum threshold situation. In another embodiment, the trigger is sent directly to the applications registered with the corresponding trigger.

In operation 220, the flow iterates through each of the set of one or more registered handlers. Once all registered handlers in the set have been processed, the flow is done at operation 280. While more registered handlers need to be processed, the flow continues to operation 230 where the registered handler is executed. As part of the execution of a registered handler, various details regarding the trigger are passed to the registered handler or alternatively the trigger itself is passed to the registered handler. These details provide registered handler with information that allows it to react to the network conditions that caused the generation of the trigger. From operation 230, the flow continues back to operation 220 with iterating through the set of one or more registered handlers.

FIG. 2 illustrates to exemplary sets of operations that may be executed by a registered handler. These steps are optional and illustrated in succession from operation 230 in dashed lines. One set of exemplary operations are operations 240-242, while another set of exemplary operations are shown 250-251.

In one registered handler, a trigger was generated indicating that link between a network element and an endpoint is being underutilized. With reference to notation used in describing FIG. 1, a trigger Tb2 is generated because the communication performance measurement Bm indicated there is more bandwidth available than the expected communication performance threshold B2, Bm>B2. In operation 240, the registered handler aggregates a first traffic flow associated with the underutilized link with a second traffic flow associated with another link to that endpoint. This allows the underutilized link to be repurposed for other traffic flows. This allows a registered handler, such as a routing application, to be aware of current network performance such as available bandwidth.

In another registered handler, a trigger was generated indicating that link between a network element and an endpoint is congested. With reference to notation used in describing FIG. 1, a trigger Tb1 is generated because the communication performance measurement Bm indicated there is less bandwidth available than the expected communication performance threshold B1, Bm<B1. In operation 250, the registered handler determines one or more route updates that should occur to reroute a traffic flow associated with the congested link. The flow continues in operation 251 with applying the route updated to a routing information base. For example, the route associated with traffic destined for that endpoint can be modified with a next hop associated with an alternative path to the endpoint.

In another embodiment, a different MPLS LSP may be designated for traffic destined for the endpoint. These techniques can provide Service Assurance of an MPLS LSP when either MPLS-TE is run or when MPLS-TP OAM has the ability to switch to an MPLS LSP that has a capacity level close to the configured communication performance threshold. The alternative MPLS LSP can be determined using the details of the trigger, the communication performance measurement, and the link-id of the congested link.

Figure 3:
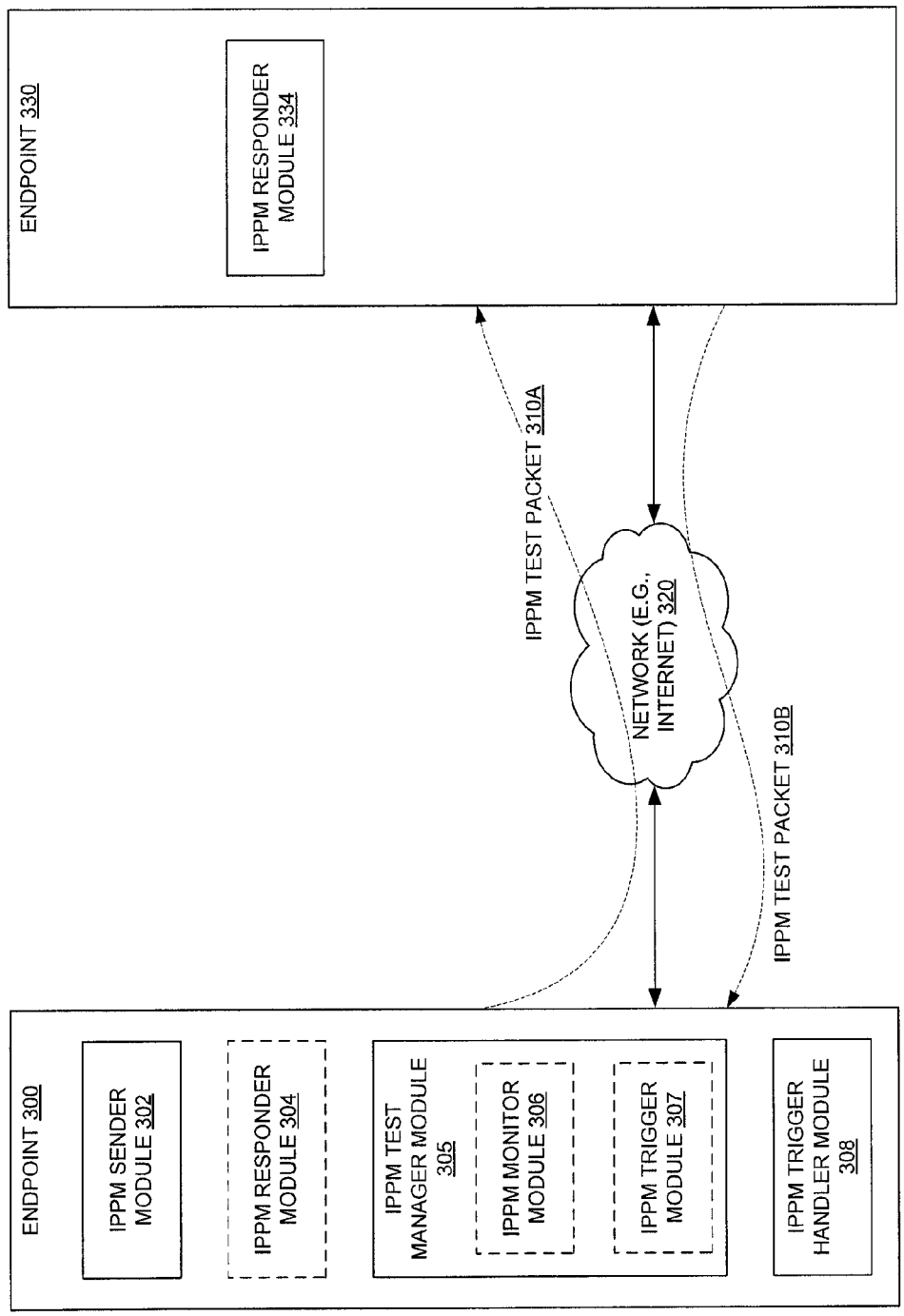
FIG. 3 is a block diagram illustrating a first network element configured to measure communication performance with a second network element and generate triggers in response to those measurements according to one embodiment.

FIG. 3 is a block diagram illustrating a first network element configured to measure communication performance with a second network element and generate triggers in response to those measurements according to one embodiment. In FIG. 3, the first network element 300 is coupled with a second network element 330, an endpoint, through a network 320. The network 320 may be any communication network such as an intra-domain network or an inter-domain network, e.g. the Internet. Further the communication protocols used by various nodes, not illustrated, within the network 320 are not relevant so long as the first network element and second network element are capable of exchanging communication performance test packets such as IP Performance Metric (IPPM) test packets.

The first network element 300 comprises an IPPM sender module 302 configured to send out communication performance test packets. The first network element is further illustrated with an optional IPPM responder module 304, shown in dashed markings, configured to respond to communication performance test packets. The second network element 330 comprises a similar IPPM responder module 334 that is configured to respond at least to IPPM test packets from the first network element 300. The IPPM responder module 334 is typically configured to respond to other IPPM test packets from other network elements that are not illustrated in FIG. 3. The first network element 300 further comprises an IPPM test manager module 305 and an IPPM trigger handler module 308.

As the IPPM test manager module 305 determines a communication performance measurement with the second network element 330 should occur, it directs the IPPM sender module 302 to transmit an IPPM test packet to the second network element 330. For example, FIG. 3 illustrates an IPPM test packet 310A travelling from the first network element 300 to the second network element 330 through the network 320. As the IPPM test manager module 305 receives IPPM test packets, such as IPPM test packet 310B, in response to IPPM test packets it has transmitted, the IPPM test manager module 305 generates communication performance measurements and compares those measurements to one or more communication performance thresholds defined in the IPPM test manager module 305 for that communication performance measurement. In one embodiment, the IPPM test manager module 305 comprises an IPPM monitor module 306, shown in dashed markings, that includes communication performance thresholds corresponding to one or more links between the first network element 300 and one or more endpoints such as network element 330.

As described above, when a communication performance measurement falls outside of a corresponding communication performance threshold, the IPPM test manager module 305 generates a trigger associated with the link associated with the communication performance measurement. The generated trigger is further associated with the communication performance threshold and the communication performance measurement. In one embodiment, the IPPM test manager module 305 comprises an IPPM trigger module 307, shown in dashed markings, that generates the appropriate trigger in response to a communication performance measurement falling outside the corresponding communication performance thresholds.

During the configuration of the network element 300, various applications such as routing applications, traffic engineering applications, and administration application register for the generated triggers. In one embodiment, the IPPM test manager module 305 passes the generated triggers to the applications that registered for said triggers. In the embodiment illustrated in FIG. 3, the network element 300 comprises a IPPM trigger handler module 308 that invokes functions registered by various applications for responding to the generated triggers. In either case, as a trigger is generated by the IPPM test manager module 305 one or more actions are invoked to respond to that trigger.

Figure 4:
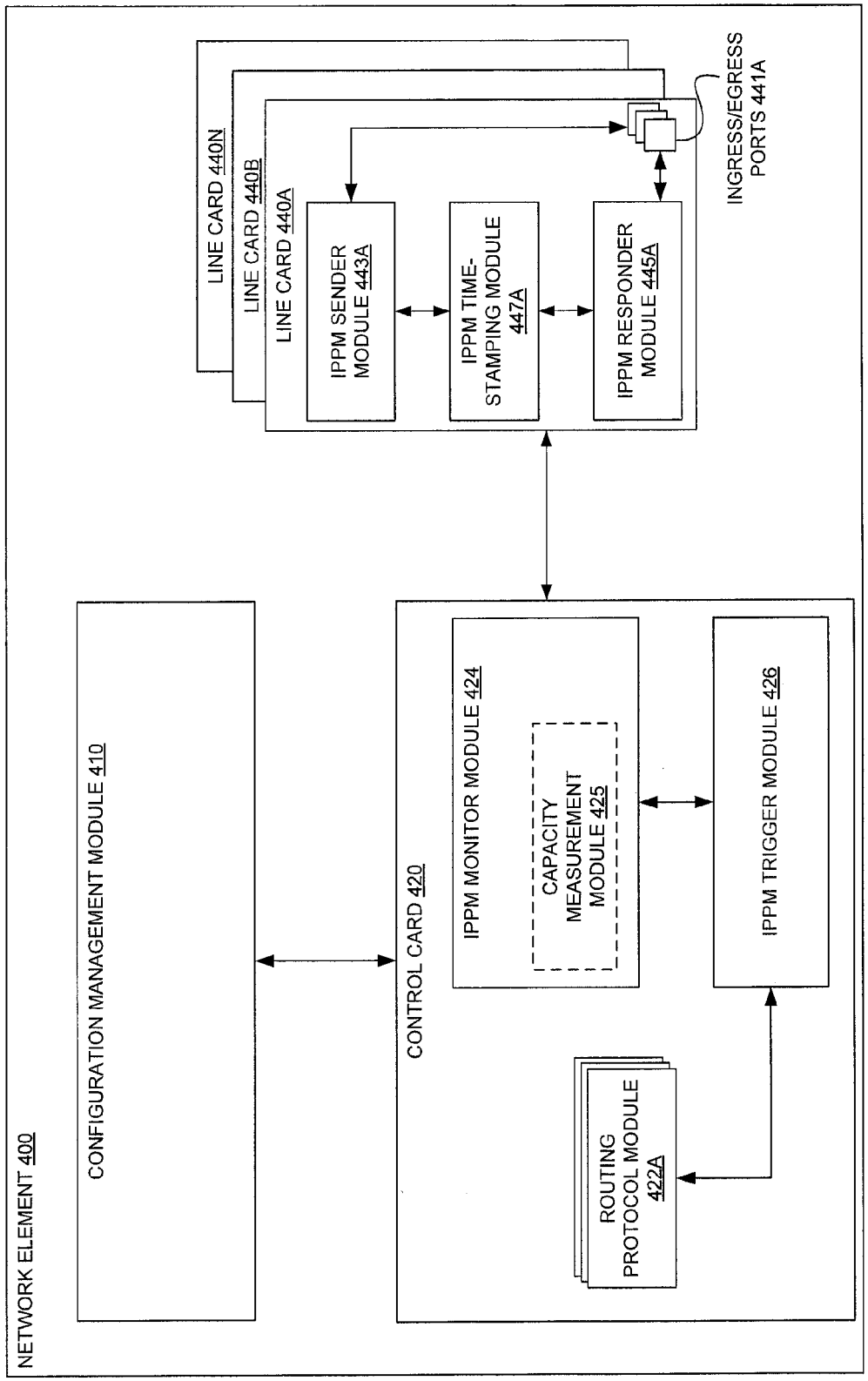
FIG. 4 is a block diagram illustrating a network element configured to measure communication performance and generate triggers in response to those measurements according to one embodiment.

FIG. 4 is a block diagram illustrating a network element configured to measure communication performance and generate triggers in response to those measurements according to one embodiment. The network element 400 comprises a configuration management module 410 coupled with a control card 420 that is coupled with a plurality of lines cards 440A-440N.

The configuration management module 410 provides an interface to configure the network element 400. In one embodiment, the interface is a command line interface provided to an administrator via a management port while in another embodiment the interface is a graphical user interface provided via a web portal. Still other suitable administrative interfaces may be utilized to accomplish similar functions. The interface allows the administrator to configure communication performance thresholds and configure applications running on the network element 400 to register for triggers generated in response to those thresholds. Further embodiments, provide for mechanisms to automate the configuration of the communication performance thresholds and the registration of triggers based on those thresholds. In this case, the configuration management module 410 allows an administrator to view and/or modify the automated configurations. The configuration management module 410 further provides a mechanism to allow the administrator to remove communication performance thresholds and/or remove the registration of applications for triggers associated with the configured communication performance thresholds. The configuration management module 410 applies the thresholds and trigger registrations to the modules in the control card 420 allow the control card to react to the network conditions that fall outside of the configured thresholds.

The control card 420 comprises an IPPM monitor module 424 coupled with an IPPM trigger module 426 which is coupled with one or more routing protocol modules 422A-N. The IPPM monitor module 424 is responsible for initiating communication performance measurements and comparing the communication performance measurement with one or more communication performance thresholds. In one embodiment, the IPPM monitor module 424 further comprises a capacity measurement module 425 configured to generate communication performance measurements corresponding with the available bandwidth between the network element 400 and one or more endpoints.

The IPPM monitor module 424 receives a set of communication performance thresholds from the configuration management module 410 that should be monitored during operation of the network element 400. Further, the IPPM trigger module 426 receives registration from either one or more applications or from the configuration management module 410. In one embodiment, for example, one of the set of one or more routing protocol modules 422A-N can register for all triggers related to communication performance measurement falling outside of communication performance thresholds related a link using the routing protocol that routing protocol module provides. In another embodiment, the configuration management module 410 provides an indication of which triggers each corresponding application should receive.

In response to a communication performance measurement falling outside of a configured communication performance threshold, the IPPM trigger module 426 generates a trigger corresponding with that communication performance threshold. In one embodiment, each of the set of corresponding applications, such as routing protocols running in the set of one or more routing protocol modules 422A-N, is provided information corresponding with a generated trigger or with the trigger itself and it is up to those applications to respond to the trigger. In another embodiment, each application that would like to react to a specific trigger registers a handler with IPPM trigger module 426 for that trigger. Then, upon generation of that trigger, each registered handler is executed with information corresponding to the trigger. In this way, various applications may all react to the same communication performance measurement falling outside of a communication performance threshold.

Each of the plurality of line cards 440A-440N comprises a set of one or more ingress/egress ports 441A-441N that couples the network element 400 with one or more other network elements 400. Each of the plurality of line cards 440A-440N further comprises an IPPM sender module 443A-443N, coupled with an IPPM time-stamping module 447A-447N that is further coupled with an IPPM responder module 445A-445N.

In response to the initiation of an communication performance measurement from the IPPM monitor module 424, IPPM sender module 443A-443N on the line card corresponding with the link being tested generates an IPPM test packet including an IPPM time-stamp from the IPPM time-stamp module 447A-447N that is on the same line card. The IPPM test packet is transmitted out on the set of one or more ingress/egress ports 441A-441N on the same line card. The one of the set of one or more ingress port/egress ports 441A-441N that is used is based on the link that couples the network element with the endpoint associated with the IPPM test packet. In response to receiving the IPPM response test packet from the designated endpoint, the IPPM monitor module 424 is sent either the IPPM response test packet or the information contained within that packet so that it can generate a communication performance measurement.

In response to receiving an IPPM test packet from another network element at the network element 400, an IPPM responder module 445A-445N generates an IPPM response test packet. The IPPM responder module 445A-445N on the line card 440A-440N at which the IPPM test packet was received with generates the IPPM response test packet that includes a time stamp provided by the corresponding IPPM time-stamping module 447A-447N.

An exemplary reaction of an application to a communication performance measurement falling outside of a communication performance threshold can be described with reference to FIG. 4. As an example, routing protocol module 422A may be an OSPF routing module that has registered a handler corresponding to a trigger indicating that bandwidth between the network element 400 and another endpoint has fallen below an amount defined in an SLA. Upon the generation of that trigger, a function executes that searches for an alternative path from the network element 400 to the endpoint capable of providing the bandwidth defined in the SLA. If an alternative path is found, the OSPF routing module updates its routing information base(s) to specify the new path between the network element 400 and the endpoint. As described above, many different types of applications and/or protocols may register for a trigger and each application and/or protocol may react to the generation of that trigger accordingly.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in a network element operating in a network for reacting to communication performance measurements falling outside of communication performance thresholds, the method comprising:

generating a communication performance measurement between a first endpoint and a second endpoint, wherein each endpoint is a point of communication in the network and at least the first endpoint resides on the network element, by:
  generating a Two-Way Active Measurement Protocol (TWAMP) test packet comprising a first timestamp approximating the egress of the test packet from the first endpoint,
  transmitting the TWAMP test packet to the second endpoint,
  receiving a TWAMP test packet response comprising the first timestamp, a second timestamp approximating an ingress time of the test packet at the second endpoint, and a third timestamp approximating an egress time of the test packet response from the second endpoint, wherein the TWAMP test packet response is received on a same path used for transmitting the TWAMP test packet to the second endpoint, and determining the communication performance measurement from at least one of the first timestamp, the second timestamp, and the third timestamp;

iterating through one or more retrieved communication performance thresholds; and for each of the one or more communication performance thresholds that are retrieved, determining whether the communication performance measurement falls outside of the communication performance threshold, generating at the network element a trigger associated with the communication performance measurement and the communication performance threshold in response to determining that the communication performance measurement falls outside of the communication performance threshold, in response to the generated trigger, retrieving a plurality of registered handlers associated with the generated trigger, wherein the plurality of registered handlers are executable functions to be executed in response to the generated trigger, wherein the plurality of registered handlers are retrieved from a list of a plurality of handlers previously registered by a plurality of separate applications, and wherein each separate application has a separate solution to one or more network condition that caused the generation of the generated trigger, passing the generated trigger to the plurality of registered handlers, wherein the generated trigger includes information that allows the registered handler to react to the network conditions that caused the generation of the generated trigger, and executing concurrently at the network element the plurality of registered handlers that are associated with the generated trigger, wherein the plurality of registered handlers, when executed, react to the one or more network conditions that caused the generation of the generated trigger, and wherein executing each of the plurality registered handlers executes a separate associated solution to the one or more network conditions that caused the generation of the generated trigger.

2. The method of claim 1 wherein the registered handler is associated with a network application.

3. The method of claim 2 wherein the network application is a layer two or layer three routing or switching application.

4. The method of claim 1 wherein the registered handler is associated with a routing protocol and wherein executing the registered handler comprises:

determining a route update; and updating a routing information base with the route update.

5. The method of claim 4 wherein the communication performance measurement is a measurement through a current route between the network element and a destination network element and wherein the determining the route update comprises:

determining an alternative route between the network element and the destination network element, wherein the alternative route is configured to provide a communication performance that falls within the communications performance threshold; and generating the route update to effect a change to the alternative route for communication traveling from the network element to the destination network element.

6. The method of claim 1 wherein:

the communication performance measurement indicated an underutilization of a first link to the endpoint; and the executing the registered handler comprises aggregating a first traffic flow with a second traffic flow, wherein the first traffic flow is associated with the first link and the second traffic flow is associated with a second link to the endpoint, and wherein the first traffic flow and the second traffic flow are designated by a source address, a destination address, a port, and a description.

7. The method of claim 6, wherein the communication performance measurement indicates an underutilization of a first link to the endpoint by measuring a capacity of the first link using Two Way Active Measurement Protocol (TWAMP) Value Added Octets.

8. A network element operating in a network for reacting to communication performance measurements falling outside of communication performance thresholds, comprising:

a set of one or more processors; and a non-transitory computer-readable medium that stores instructions for a computer program that reacts to communication performance measurements falling below communication performance thresholds, the computer program including:

an internet protocol ("IP") performance metric ("IPPM") monitor module configured to:

generate a communication performance measurement between a first endpoint and a second endpoint, wherein each endpoint is a point of communication in the network and at least the first endpoint resides on the network element, by generating a Two-Way Active Measurement Protocol (TWAMP) test packet to comprise a first timestamp to approximate the egress of the test packet from the first endpoint, communicating the TWAMP test packet to the second endpoint, receiving a TWAMP test packet response to comprise the first timestamp, a second timestamp to approximate the ingress of the test packet at the second endpoint, and a third timestamp to approximate the egress of the test packet response from the second endpoint, wherein the TWAMP test packet response is received on a same path used to communicate the TWAMP test packet to the second endpoint, and determining the communication performance measurement from at least one of the first timestamp, the second timestamp, and the third timestamp;

iterate through one or more retrieved communication performance thresholds;

for each of the one or more communication performance thresholds that are retrieved, determine whether the communication performance measurement falls outside of the communication performance threshold; and an IPPM trigger module configured to perform the following:

generate a trigger in response to the determination that the communication performance measurement falls outside the communication performance threshold;

in response to the generated trigger, retrieve a plurality of registered handlers associated with the generated trigger, wherein the plurality of registered handlers are executable functions to be executed in response to the generated trigger, wherein the plurality of registered handlers are retrieved from a list of a plurality of handlers previously registered by a plurality of separate applications, and wherein each separate application has a separate solution to one or more network condition that caused the generation of the generated trigger, pass the generated trigger to the plurality of registered handlers wherein the generated trigger includes information that allows the registered handler to react to the network conditions that caused the generation of the generated trigger, and initiate concurrent execution of the plurality of registered handlers that are associated with the generated trigger, wherein the plurality of registered handlers, when executed, react to the one or more network conditions that caused the generation of the generated trigger, and wherein the execution of each of the plurality of registered handlers is to execute a separate associated solution to the one or more network conditions that caused the generation of the generated trigger.

9. The network element of claim 8 wherein the registered handler is to be associated with a layer two or layer three routing or switching application.

10. The network element of claim 9 wherein the network application is a multiprotocol label switching network protocol application, an open shortest path first routing application, a border gateway protocol application, an interior gateway protocol application, an exterior gateway protocol application, a shortest path bridging application, or a resource reservation protocol application.

11. The network element of claim 8 wherein the registered handler is to be associated with a routing protocol and wherein the registered handler is configured to:
determine a route update; and
update a routing information base with the route update.

12. The network element of claim 11 wherein the communication performance measurement is to indicate an underutilization of a first link to the second endpoint and wherein the registered handler is configured to aggregate a first traffic flow with a second traffic flow, wherein the first traffic flow is to be associated with the first link and the second traffic flow is to be associated with a second link to the second endpoint, and wherein the first traffic flow and the second traffic flow are designated by a source address, a destination address, a port, and a description.

13. The network element of claim 11 wherein the communication performance measurement is to be a measurement through a current route between the network element and a destination network element and wherein the registered handler is configured to:
determine an alternative route between the first endpoint and the second endpoint, wherein the alternative route is configured to provide a communication performance that falls within the communications performance threshold; and
generate the route update to effect a change to the alternative route for communication traveling from the first endpoint and the second endpoint.

14. The network element of claim 8, wherein the IPPM trigger module is further configured to:
register a plurality of handlers with the generated trigger, wherein the plurality of handlers comprises the registered handler and another handler,
wherein said retrieving the registered handler associated with the generated trigger further comprises retrieving the another handler, and wherein said executing the registered handler further comprises executing the another handler.

15. A network element operating in a network for reacting to communication performance measurements falling outside of communication performance thresholds, the network element comprising:
a line card comprising:
a set of one or more ports to be coupled with one or more endpoints,
an internet protocol ("IP") performance metric ("IPPM") sender module coupled with the set of one or more ports, the IPPM sender module configured to send a first Two-Way Active Measurement Protocol (TWAMP) test packet to a first of the one of the one or more endpoints,
an IPPM time-stamping module coupled with the IPPM sender module, the IPPM time-stamping module configured to include a time-stamp in the first TWAMP test packet to approximate a time at which the first TWAMP test packet will leave the line card; and
a control card coupled with the line card, the control card comprising:
an IPPM monitor module configured to:
receive a second TWAMP test packet that originated from the first endpoint, wherein the second TWAMP test packet is received on a same path used to send the first TWAMP test packet to the first endpoint,
generate a communication performance measurement from the second test packet,
iterate through one or more retrieved communication performance thresholds,
for each of the one or more of communication performance thresholds that are retrieved, determine whether the communication performance measurement falls outside of the communication performance threshold, and
an IPPM trigger module configured to:
generate a trigger in response to the determination that the communication performance measurement falls outside the communication performance threshold,
in response to the generated trigger, retrieve a plurality of registered handlers associated with the generated trigger, wherein the plurality of registered handlers are executable functions to be executed in response to the generated trigger, wherein the plurality of registered handlers are retrieved from a list of a plurality of handlers previously registered by a plurality of separate applications, and wherein each separate application has a separate solution to one or more network condition that caused the generation of the generated trigger, and
initiate concurrent execution of the plurality of registered handlers that are associated with the generated trigger,
pass the generated trigger to the plurality of registered handlers, wherein the generated trigger includes information that allows the registered handler to react to the network conditions that caused the generation of the generated trigger, and
a routing protocol module configured to:
register the registered handler with the IPPM trigger module, and
execute the registered handler, wherein the plurality of registered handlers, when executed, react to the one or more network conditions that caused the generation of the generated trigger, and wherein the execution of each of the plurality of registered handlers is to execute a separate associated solution to the one or more network conditions that caused the generation of the generated trigger.

16. The network element of claim 15 wherein the registered handler wherein the registered handler is configured to:
   determine a route update; and
   update a routing information base with the route update.

17. The network element of claim 15 wherein the line card is servicing a first traffic flow to the first endpoint, the communication performance measurement is to indicate an underutilization of a first link to the first endpoint, and the registered handler is configured to aggregate the first traffic flow with a second traffic flow, wherein the first traffic flow is to be associated with the first link and the second traffic flow is to be associated with a second link to the first endpoint, and wherein the first traffic flow and the second traffic flow are designated by a source address, a destination address, a port, and a description.

18. The network element of claim 15 wherein the communication performance measurement is to be a measurement through a current route between the line card and the first endpoint and wherein the registered handler is configured to:
   determine an alternative route between the line card and the first endpoint, wherein the alternative route is configured to provide a communication performance that falls within the communications performance threshold; and
   generate a route update to effect a change to the alternative route for communication traveling from the line card and the first endpoint.

19. The network element of claim 15 wherein the routing protocol module is a executing a layer two or layer three routing or switching application.

20. The method of claim 1, further comprising:
   registering a plurality of handlers with the generated trigger, wherein the plurality of handlers comprises the registered handler and another handler,
   wherein said retrieving the registered handler associated with the generated trigger further comprises retrieving the another handler, and
   wherein said executing the registered handler further comprises executing the another handler.

21. The network element of claim 15, wherein:
   the routing protocol module is further configured to register another handler with the IPPM trigger module to be executed upon the IPPM trigger module receiving the generated trigger from the IPPM monitor module; and
   the IPPM trigger module is further configured to:
      retrieve the another handler associated with the generated trigger to indicate that the another handler also requires execution in response to the generated trigger, and
      initiate execution of the another handler.

* * * * *

UNITED STATES PATENT AND TRADEMARK OFFICE
CERTIFICATE OF CORRECTION

| | | |
|---|---|---|
| PATENT NO. | : 9,032,068 B2 | Page 1 of 1 |
| APPLICATION NO. | : 13/289854 | |
| DATED | : May 12, 2015 | |
| INVENTOR(S) | : Chakrabarti et al. | |

It is certified that error appears in the above-identified patent and that said Letters Patent is hereby corrected as shown below:

On the Title Page, in Item (75), under "Inventors", in Column 1, Line 4, delete "Frazier," and insert -- Frazier, II --, therefor.

In the Specification

In Column 5, Line 32, delete "an is such" and insert -- an --, therefor.

In Column 5, Line 42, delete "range is" and insert -- range --, therefor.

In the Claims

In Column 12, Line 31, in Claim 8, delete "by" and insert -- by: --, therefor.

Signed and Sealed this
Seventeenth Day of November, 2015

Michelle K. Lee
*Director of the United States Patent and Trademark Office*